United States Patent
Gokhale et al.

(10) Patent No.: US 7,975,666 B2
(45) Date of Patent: Jul. 12, 2011

(54) QUICK ENGINE STARTUP SYSTEM AND METHOD

(75) Inventors: Manoj Prakash Gokhale, Bangalore (IN); Yogesh Kumar, Bangalore (IN)

(73) Assignee: General Electric Company, Schenectady, NY (US)

(*) Notice: Subject to any disclaimer, the term of this patent is extended or adjusted under 35 U.S.C. 154(b) by 659 days.

(21) Appl. No.: 12/039,264

(22) Filed: Feb. 28, 2008

(65) Prior Publication Data

US 2009/0217898 A1  Sep. 3, 2009

(51) Int. Cl.
*F02D 41/06* (2006.01)

(52) U.S. Cl. .................. 123/179.18; 123/531

(58) Field of Classification Search ......... 123/179.18, 123/531, 585, 24
See application file for complete search history.

(56) References Cited

U.S. PATENT DOCUMENTS

| | | | |
|---|---|---|---|
| 2,983,267 A * | 5/1961 | Percival ............... 123/559.1 |
| 3,020,901 A * | 2/1962 | Cook ................... 123/559.1 |
| 3,141,448 A * | 7/1964 | Candelise ................ 123/26 |
| 3,513,929 A * | 5/1970 | Kim ...................... 180/302 |
| 4,240,381 A * | 12/1980 | Lowther ................ 123/26 |
| 4,424,676 A * | 1/1984 | Meiners ............... 60/605.1 |
| 4,481,773 A * | 11/1984 | Sugito et al. .......... 60/606 |
| 5,064,423 A * | 11/1991 | Lorenz et al. ......... 60/611 |
| 5,299,547 A * | 4/1994 | Michimasa ......... 123/559.1 |
| 5,404,852 A * | 4/1995 | Frankle ................ 123/321 |
| 6,484,673 B1 * | 11/2002 | Davis et al. ............ 123/26 |
| 6,826,910 B1 * | 12/2004 | Easton .................. 60/597 |
| 7,128,064 B2 * | 10/2006 | Heider ................. 123/585 |
| 7,465,337 B2 * | 12/2008 | Gaertner et al. ....... 95/54 |
| 7,628,144 B2 * | 12/2009 | Vetrovec ............ 123/559.1 |
| 7,661,417 B2 * | 2/2010 | Stewart et al. ....... 123/585 |
| 7,665,302 B2 * | 2/2010 | Nemeth et al. ....... 60/605.1 |
| 7,762,069 B2 * | 7/2010 | Gerum ................. 123/585 |
| 2003/0015185 A1 * | 1/2003 | Dutart ................. 123/585 |
| 2004/0025507 A1 * | 2/2004 | Leigh et al. ........... 60/608 |
| 2004/0112349 A1 * | 6/2004 | Livingston et al. .... 123/585 |
| 2005/0199231 A1 * | 9/2005 | Heider ................. 123/585 |
| 2006/0042466 A1 * | 3/2006 | Gaertner et al. ........ 96/4 |
| 2007/0246008 A1 * | 10/2007 | Gerum ................. 123/316 |
| 2007/0283939 A1 * | 12/2007 | Berger et al. ......... 123/585 |
| 2008/0066467 A1 * | 3/2008 | Nemeth et al. ....... 60/606 |
| 2008/0072595 A1 * | 3/2008 | Nemeth et al. ....... 60/605.1 |

* cited by examiner

*Primary Examiner* — Hieu T Vo
*Assistant Examiner* — Arnold Castro
(74) *Attorney, Agent, or Firm* — GE Global Patent Operation; John A. Kramer

(57) ABSTRACT

A technique is provided for improved response of internal combustion engines to increased load demands. The engine is equipped with an air storage tank that stores compressed air. The air may be stored at an elevated pressure (e.g., manifold air pressure) during normal full load operation of the engine. Valving maintains the compressed air isolated during normal operation. During transitory periods of higher power output demand, the compressed air is directed to the engine, and output of a turbo-driven compressor can be vented to avoid surge. The technique allows for quicker reaction to load demands, and improved combustion during transitory periods, and reduced particulate and smoke emissions.

19 Claims, 3 Drawing Sheets

QUICK ENGINE STARTUP SYSTEM AND METHOD

BACKGROUND

The present invention relates generally to internal combustion engines and engine controls, and particularly to large engines used in demanding applications, such as work vehicles, locomotives, gensets and so forth.

Many control approaches and schemes have been devised for internal combustion engines, particularly for large, powerful diesel engines and engines running on other fuels. In railway locomotives, for example, such engines serve to generate electrical power which is transmitted to wheel-axle units. The wheel-axle units include electric motors that are driven to provide the desired tractive effort to move the locomotive and any railway cars coupled to it along railways. Other applications for large, powerful engines include ships, tractors, on and off-road trucks, electrical power generators, and so-forth.

One difficulty that arises in such applications involves the need for significant power output for the engine from either a cold start or in response to changing conditions, such as increased power demand. For example, during periods of acceleration, an operator may command higher speed and/or torque from the vehicle, requiring higher power output from the engine. In the case of locomotives and other transport vehicles, when steeper grades are encountered, additional torque or tractive effort is required to maintain the speed of a vehicle or train, requiring greater power output from the engine.

Conventional engine controls may not appropriately respond to such higher power output demands. For example, because higher power is required of the engine, the engine controls will generally cause greater amounts of fuel to be injected into the engine. The fuel increase may not be immediately matched, however, by proportionate increases in air supplied to the engine. As a result, the fuel-air mixture may become too rich during the resulting transitional period, causing a significant reduction or droop in engine speed, which is only recuperated quite slowly. Such speed droops are not generally desirable. Similarly, the richer mixture supplied to the engine can exceed design limits, resulting in inefficient combustion, and the discharge of smoke or particulate from the engine exhaust. Such discharges, while not necessarily problematic environmentally, are generally to be avoided.

There is a need, therefore, for improved engine arrangements and engine controls that can respond more quickly to start-up and power demand situations and avoid these drawbacks.

SUMMARY OF THE INVENTION

The present invention provides a novel engine system and method of controlling such a system designed to respond to such needs. The invention may be applied in a wide range of settings, such as for driving locomotive engines, ship engines, engines of other work and transport vehicles, generator engines, and so forth. The invention allows for improved response to increased power demands, while reducing the depth of speed reductions and improving the time of recuperating from such speed reductions. The invention also allows for improved control of the fuel-to-air mixture, reducing emissions and providing more efficient combustion during a transition period in response to increased power output demands.

In accordance with certain aspects of the technique, a storage vessel is provided for storing compressed air that may be injected into the engine in response to increased power demands. The storage vessel may be charged by a compressor that is used to provide air to engine during normal operation. Valving may be provided that allows for the stored air to remain isolated during normal engine operation. When particular power demands are made on the engine, then, the valving may be actuated to inject the compressed air into the engine to decrease the fuel-to-air ratio as fuel injection rates are increased. Additional valving may allow for discharging of air from the compressor during such operation, to avoid surge.

BRIEF DESCRIPTION OF THE FIGURES

These and other features, aspects, and advantages of the present invention will become better understood when the following detailed description is read with reference to the accompanying drawings in which like characters represent like parts throughout the drawings, wherein.

DETAILED DESCRIPTION

Figure 1:
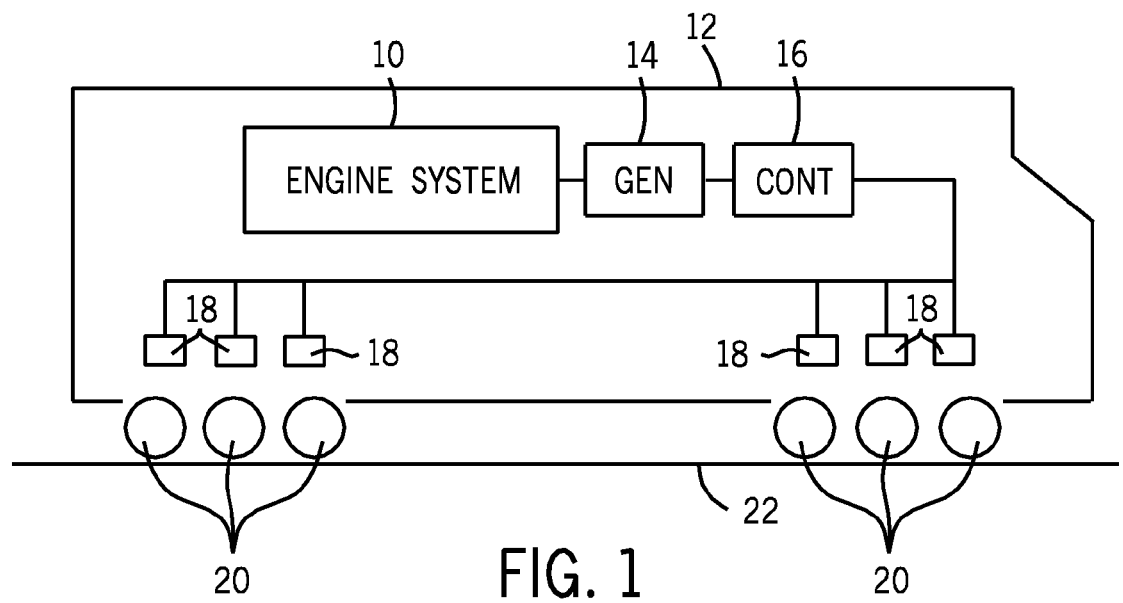
FIG. 1 is a diagrammatical representation of an exemplary engine system, here used in a railway locomotive, in accordance with the invention.

Turning now to the drawings, referring first to FIG. 1, an engine system 10 is illustrated in an exemplary embodiment. Specifically, engine system 10 is provided in a railway locomotive 12. The engine system drives a generator 14 that produces electrical power that may be stored and is ultimately applied for driving the locomotive to pull railway cars coupled to it. An electrical control and distribution system 16 will typically be provided for controlling operation of the electrical components, including the generator, and electric motors 18 coupled to wheel-axial sets 20. For the present purposes, controller 16 may also be considered to control operation of engine system 10, although, as will be appreciated by those skilled in the art, the engine system will typically have its own dedicated engine controller, or several controllers that work in unison to regulate operation of the engine to regulate tractive effort output by the wheel-axial sets, and so-forth. Ultimately, power generated by the engine system 10 is transformed to electrical energy by generator 14 that will be used by the motors 18 to drive the locomotive along rails as indicated generally by reference numeral 22 in FIG. 1.

Although the present invention is discussed herein within the context of a locomotive application, it should be borne in mind that other applications may be envisaged as well. As described below, the invention allows for rapid and efficient response to increased power demands of the engines, and such power demands may be found in applications such as boat and ship propulsion systems, energy or electric power generating systems, on and off-road vehicle systems, and so forth. Similarly, while the present invention contemplates application in diesel-powered internal combustion engines, similar techniques may be employed within the scope of the invention to engines running on other fuels, including gasoline, various oils, and other combustibles.

The engine system 10 will include a wide range of components and subsystems that may be familiar to those skilled in the art. Certain of those components, along with elements of the invention are illustrated diagrammatically in FIG. 2. As will be appreciated by those skilled in the art, the engine system will typically include an air supply system 24 that provides air to an engine 26, in which the air is combined with fuel for combustion in the engine cylinders. The combustion drives a mechanical process which produces useful work at an output shaft. The air supply system 24 will typically include an inlet 28 in which a filter is provided for removing particulate matter from the air drawn into the engine. A turbo-driven compressor 32 draws air from the atmosphere and compresses the air for injection into the engine depending upon the amount of fuel being injected, which is itself typically a function of the power demanded from the engine at any particular time. The compressor 32 forces air through an intercooler 34 which reduces the temperature of the air applied to the engine. Following combustion, exhaust gases from the engine are routed through a turbine 36 that is mechanically coupled to the compressor 32 and that drives the compressor in rotation to compress the inlet air for application to the engine.

As will appreciated by those skilled in the art, the entire air supply system may function under the regulation of control circuitry and in accordance with control algorithms to regulate the efficiency of fuel usage, power output by engine, response to transitory conditions, and so-forth. In accordance with the invention, the air supply system 24 allows for rapid response to increases in power output demands that may result from operator inputs, automated control inputs, increases in speed and/or torque demand, and consequent transitory reductions in speed resulting from such demands.

Figure 2:
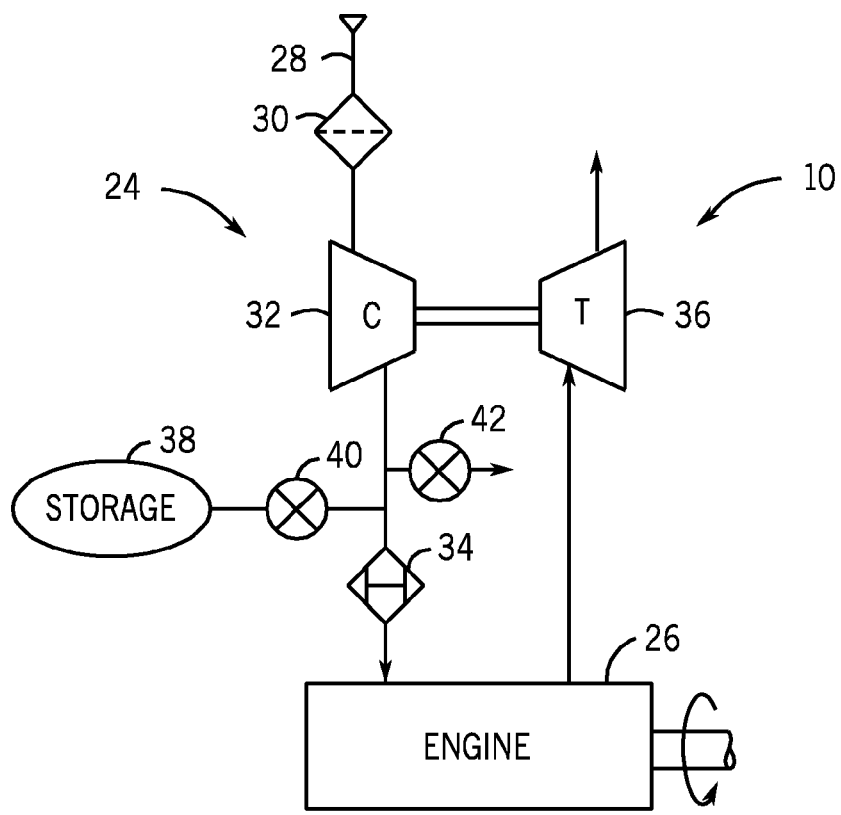
FIG. 2 is a diagrammatical representation of certain of the functional components of the engine system including a compressed air storage vessel and valving used to promote improved performance in response to power demands.

As illustrated in FIG. 2, an air storage tank or vessel 38 is provided in the air supply system 24 and is isolated from an output line of compressor 32 by valving 40. In the presently contemplated embodiment, the storage tank 38 is of a sufficient volume to allow for the application of compressed air in relatively short transient periods in which increased power demands are made on the engine. The particular volume and the pressure at which the storage tank operates will, of course, depend upon the size and performance characteristics of the engine (e.g., fuel flow rates, design air flow rates, design inlet operating pressures, and so forth). Valving 40 may include, for example, remotely (e.g., solenoid) operated three-way valving that allows the storage tank 38 to be selectively coupled to the output of the compressor 32, or isolated from the compressor once sufficient compressed air has been stored in the tank. Valving 40 also permits, as described more fully below, output from the compressor to be interrupted temporarily, with the inlet to the engine, such as through intercooler 34, being coupled to the storage tank 38, whereby the storage tank 38 may provide a volume of pressurized air for improved operation of the engine during transitory periods.

As also described below, the exemplary embodiment illustrated in FIG. 2 includes further valving 42 that allows for venting of air from the compressor during such transitory periods. That is, because the pressure within the storage tank 38 may be higher than or similar to the pressure of air output by the compressor during transitory periods, allowing for flow from the storage tank to the inlet line of the engine and interrupting flow from the compressor may cause a surge of the compressor. This may be avoided by allowing valving 42 to vent uncompressed air flow from the compressor during such transitory periods, and to reestablish flow by interrupting such venting once normal operation has been resumed.

In presently contemplated embodiments, the pressure of compressed air stored in tank 38 will be equal to or slightly higher than the typical manifold air pressure reigning a full load conditions. In a presently contemplated design, for example, the arrangement will allow for engine start-up from idling (e.g., from approximately 1000 RPM, no load) to a loaded running condition (e.g., maintaining 1000 RPM under a load of 60%) in a reduced time, on the order of 40% time reduction in a presently contemplated embodiment. As described below, by comparison, conventional engines may not achieve such speed under load until much later. As also described below, the arrangement allows for improved efficiency in combustion during such transitory periods by improving the fuel-to-air ratio, thereby avoiding excessive smoke and particulate discharge from the engine.

Figure 3:
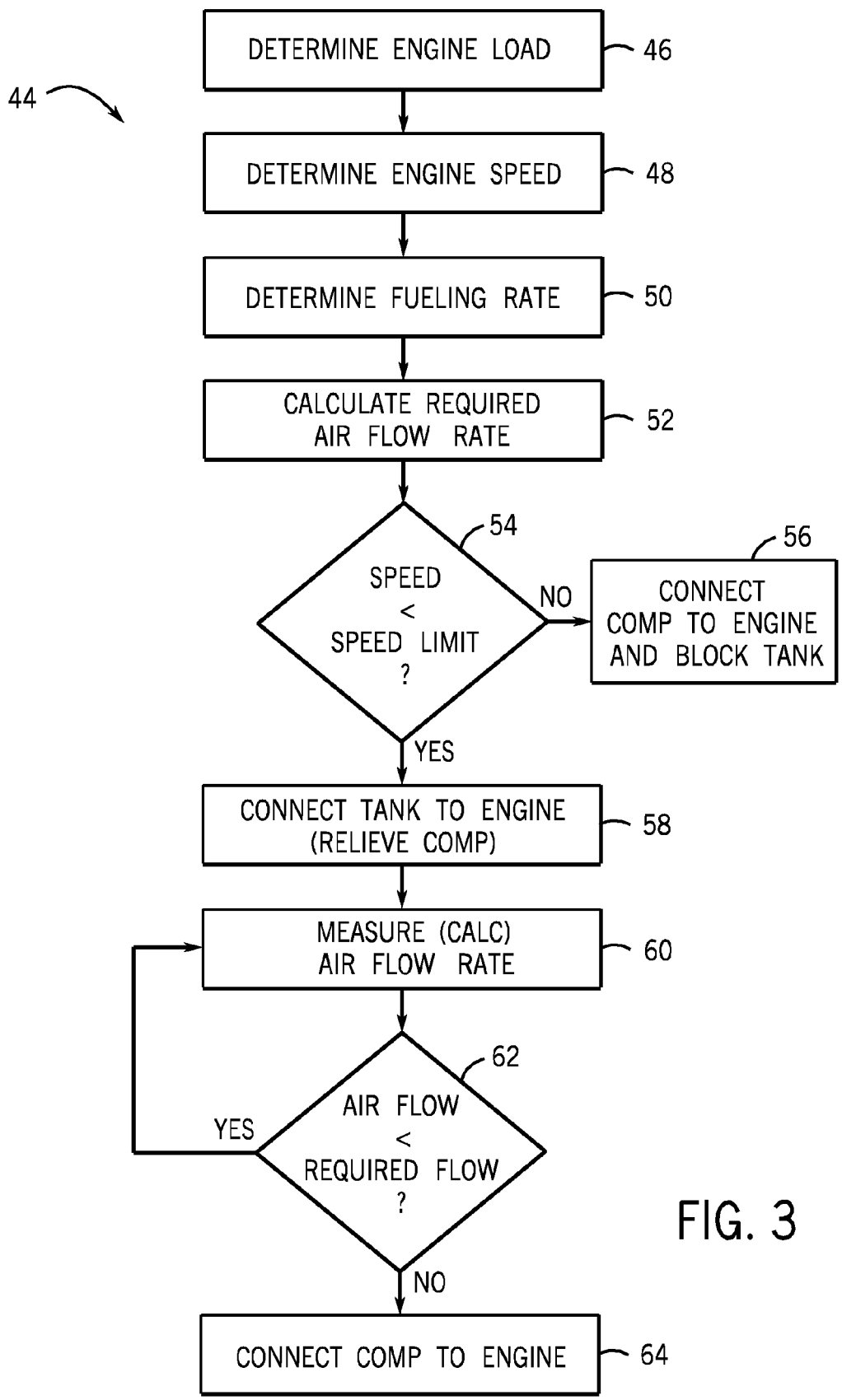
FIG. 3 is a flow chart illustrating exemplary control logic for operation of the engine system of FIG. 2.

FIG. 3 illustrates exemplary control logic for regulating the system of FIG. 2 in accordance with aspects of the invention. The logic, designated generally by reference numeral 44 will include detecting of specific engine parameters, including engine load (or a parameter indicative of load), as indicated by reference numeral 46, engine speed as indicated by reference numeral 48, and fueling rate as indicated at reference numeral 50. In practice, the engine load may result from manual or automated throttling of the engine, or from environmental conditions, such as an incline encountered by a locomotive. Such load parameters may be detected in accordance with any conventionally known technique. The engine speed may be sensed by conventional sensing systems, and the fueling rate (e.g., flow rate) may similarly be sensed, although in certain applications the fueling rate will be dictated by the engine controller, and this command value may be used in the control logic. Based upon such parameters, then, the required air flow rate is calculated as indicated by reference numeral 52. Various approaches for computation of such air flow rates are well known in the art and are beyond the scope of the present invention. In general, however, the air flow rate will be a function of the fueling rate required for the engine load and speed. As noted above, the air flow rate will typically be a function of the type of engine, the performance characteristics or design characteristics of the engine, the type of fuel utilized, pressures and temperatures reigning in the engine environment and so-forth.

In an exemplary embodiment, the normal operation of the engine may be based upon output speed, and a determination made, as indicated at step 54 in FIG. 3, whether the current speed of the engine is below a desired speed limit. If the speed is not below the desired speed limit, normal operation of the engine can continue, and, as indicated at step 56, the compressor described above with reference to FIG. 2 can be coupled to the engine, and the reserve compressed air storage tank 38 (see FIG. 2) blocked by valving 40. This will typically correspond to normal operation of the engine during idle and at normally loaded states.

When, however, it is determined that the engine speed has declined below a desired level or that additional loading is being placed on the engine (i.e., that power output demands have increased), and that additional air is needed for matching the increased fuel rate required by an increase in load, the compressed air storage tank 38 is placed in communication with the engine as indicated at step 58. As noted above, this can be done by sending an appropriate control signal to valving 40 which is shifted to allow flow of air from the tank 38 to the engine. At the same time, valving 40 may close the outlet of compressor 32 to direct the higher pressure air to the engine. In coordination with valving 40, then, valving 42 may be shifted to open a vent to direct air from the compressor to the atmosphere, thereby aiding in preventing surge of the compressor. During this transitory stage, then, higher pressure air is provided to the engine for short periods to allow the engine to recuperate from speed reductions and more efficiently burn the increased fuel injected as a result of the higher power output demand.

As indicated at step 60, then, the air flow rate may be measured or calculated, and, where desired, the output flow rate from the compressed air tank may be regulated. In more straightforward designs, the system may simply continue to vent air in an open-loop fashion from the storage tank 38 until the air flow is found to meet or exceed the required flow as indicated at step 62 in FIG. 3. Once the air flow requirements can be met by compressor 32 (e.g., the fueling rate can be matched by output from the compressor, while maintaining a desired fuel-to-air ratio), the valving may be shifted back to its initial state to reconnect the compressor to the engine as indicated at step 64.

While not represented in FIG. 3, operation of the air supply system will also typically include opening of valving 40 during periods of normal operation to allow charging of air into the storage tank 38. In the presently contemplated embodiment, for example, compressed air at a pressure equal to the full load intake manifold pressure (e.g., over approximately 3 bar) is stored in the storage tank during full load operation of the engine by allowing some air from the compressor into the tank via valving 40. The valving is, then, shifted to a closed position when the desired pressure is reached, such as at a pressure equal to the manifold air pressure at full load. These pressures will, however, depend upon the particular engine design. Moreover, a point at which the air storage tank is coupled to the engine in the transitory high-demand periods will depend upon the engine specifications. An electronic control unit of the engine increases the fueling rate to enable the engine to generate power to meet increased load requirements. Similarly, ratios of air-to-fuel, typically maintained below 35:1 in presently contemplated applications to avoid excessive smoke and particulate emission, will depend upon the specific engine design parameters.

Figure 4:
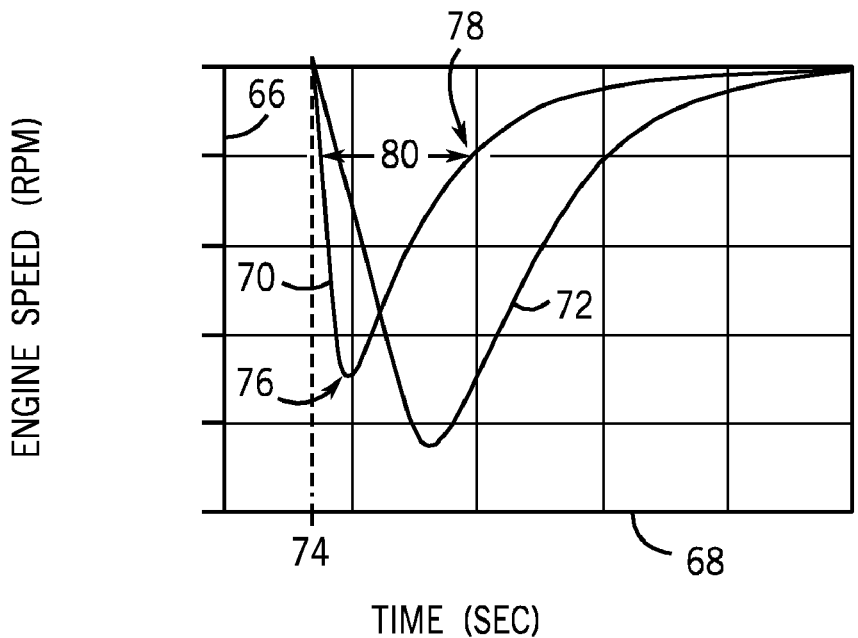
FIG. 4 is a graphical representation of engine speed versus time obtainable with conventional arrangements and with the invention.

It has been found that the foregoing technique allows for the engines to be more quickly accelerated due to the availability of the stored compressed air and to its release during transitory periods. As illustrated in FIG. 4, for example, in the presently contemplated embodiment, engine speed as indicated along axis 66 was calculated at a function of time along axis 68 for conventional engine delivery arrangements versus the arrangement described above. In a trace 70 corresponding to operation of the system of the invention, a droop 76 is noted just after initiation of an increased load demand at time 74. At the same time or shortly after increasing the fuel flow rate, then, valving is shifted to permit injection of higher pressure air from a storage tank, resulting in recuperation of engine speed as indicated at reference numeral 78. As a design criterion, the simulation tested the time required to recuperate back to the original desired speed (e.g., 1000 RPM). By use of the present technique described above, the time lag 80 (i.e., time to recuperate to the original speed) was reduced by approximately 40%. By contrast, a conventional system, as indicated by trace 72 in FIG. 4, experienced a considerably deeper speed droop, with a significantly longer period of recuperation.

Figure 5:
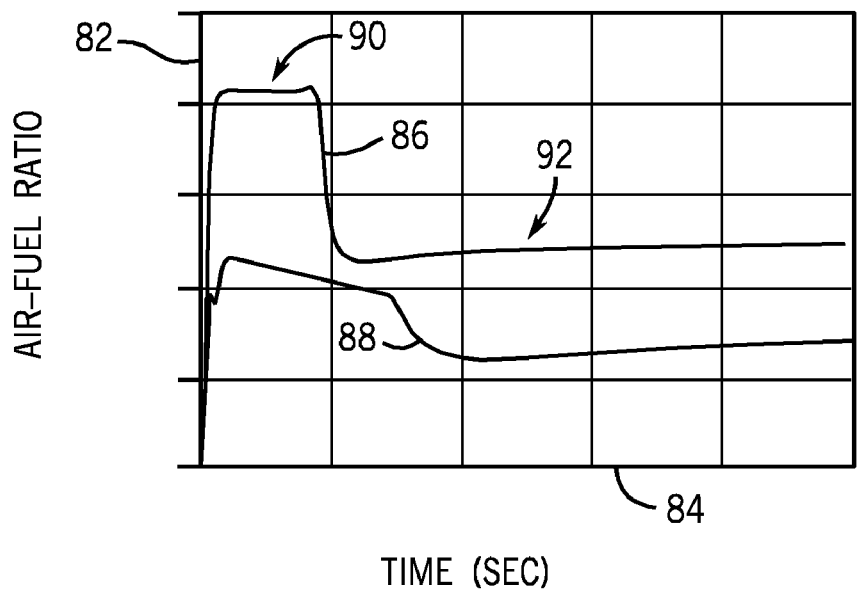
FIG. 5 is a graphical representation of air-fuel ratios that may be obtained with the invention versus those of conventional arrangements.

Similarly, as indicated in FIG. 5, the present technique allowed for a reduction in the fuel-air ratio during such transitory periods. In the simulation summarized in FIG. 5, the air-fuel ratio indicated along axis 82 is graphed versus time along axis 84. Trace 86 in FIG. 5 represents a simulation of performance of an engine in accordance with the present invention. As shown by this trace, during a transitory period of increased power output demand, because additional pressurized air is introduced from the storage tank, a significant increase in air-fuel ratio is experienced as indicated by reference numeral 90, followed by the reduction in air-fuel ratio to a level considered to correspond to efficient combustion as indicated at reference numeral 92. In this particular application, the design ratio was approximately 32-35:1. By contrast, a conventional engine, as indicated by trace 88, experiences significantly lower air-fuel ratios during the transitory period and substantially beyond this period, extending to more than 12 seconds, during which period particulate emissions, smoke and so forth may be produced. In particular, in the illustrated application, increased potential for such particulate and smoke emission occurs with an air-fuel ratio below 30:1.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for operating an internal combustion engine comprising:
   charging a compressed air storage vessel via a turbo-driven compressor during normal operation of the engine; and
   discharging compressed air from the vessel to the engine to enhance fuel combustion during a period of application of a load to the engine and thereby to reduce time of acceleration of the engine and to maintain an air to fuel ratio above a desired level.

2. The method of claim 1, comprising operating directional control valving to channel air flow from the vessel to the engine.

3. The method of claim 2, comprising operating second directional control valving to vent air from the compressor and thereby to avoid surge in the compressor.

4. The method of claim 1, comprising sensing speed of the engine and discharging compressed air from the vessel to the engine when engine speed is reduced below a desired level due to application of a load to the engine.

5. The method of claim 1, wherein the vessel is charged to a pressure of the full load intake manifold pressure.

6. A method for operating an internal combustion engine comprising:
   charging a compressed air storage vessel via a turbo-driven compressor during normal operation of the engine;
   operating directional control valving to isolate the compressor from the vessel; and
   upon application of a load to the engine, increasing fuel supply to the engine and operating the directional control valving to discharge compressed air from the vessel to the engine to enhance fuel combustion and thereby to reduce time of acceleration of the engine.

7. The method of claim 6, wherein operation of the directional control valve during application of the load interrupts flow of air from the compressor to the engine.

8. The method of claim 7, comprising operating second directional control valving during application of the load to the engine to vent air from the compressor and thereby to avoid surge in the compressor.

9. The method of claim 6, comprising sensing speed of the engine and discharging compressed air from the vessel to the engine when engine speed is reduced below a desired level due to application of a load to the engine.

10. The method of claim 6, comprising discharging compressed air from the vessel sufficient to maintain an air-to-fuel ratio above a desired level.

11. The method of claim 6, wherein the vessel is charged to a pressure of the full load intake manifold pressure.

12. A method for operating an internal combustion engine comprising:

charging a compressed air storage vessel via a turbo-driven compressor during normal operation of the engine;

operating first directional control valving to isolate the compressor from the vessel and to direct air from the compressor to the engine; and upon application of a load to the engine, increasing fuel supply to the engine, operating the first directional control valving to discharge compressed air from the vessel to the engine to enhance fuel combustion and to reduce time of acceleration of the engine, and operating second directional control valving to vent air from the compressor and thereby to avoid surge in the compressor.

13. The method of claim 12, comprising sensing speed of the engine and discharging compressed air from the vessel to the engine when engine speed is reduced below a desired level due to application of a load to the engine.

14. The method of claim 12, comprising discharging compressed air from the vessel sufficient to maintain an air-to-fuel ratio above a desired level.

15. The method of claim 12, wherein the vessel is charged to a pressure of the full load intake manifold pressure.

16. An engine system comprising:

a turbo-driven compressor;

a compressed air storage vessel;

directional control valving operative to charge the vessel with compressed air from the compressor during normal operation of the engine, and to direct compressed air from the vessel to the engine upon application of a load to the engine; and second directional control valving operative to vent air from the compressor and thereby to avoid surge in the compressor when compressed air is directed from the vessel to the engine.

17. The system of claim 16, comprising a sensor for sensing speed of the engine, compressed air being discharged from the vessel to the engine when engine speed is reduced below a desired level due to application of a load to the engine, as indicated by the sensor.

18. The system of claim 17, comprising a controller coupled to the sensor and to the directional control valving, the controller regulating application of compressed air from the vessel to the engine based upon signals received from the sensor.

19. A method for operating an internal combustion engine comprising:

charging a compressed air storage vessel via a turbo-driven compressor during engine operation with engine speed above an engine speed level; and discharging compressed air from the vessel to the engine to enhance fuel combustion in response to changes in engine load during engine operation with engine speed below the engine speed level to reduce time of acceleration of the engine speed.

\* \* \* \* \*